United States Patent [19]

Lubowitz

[11] Patent Number: 5,401,452
[45] Date of Patent: Mar. 28, 1995

[54] METHODS FOR ENCAPSULATING WASTE AND PRODUCTS THEREOF

[75] Inventor: Hyman R. Lubowitz, Rolling Hill Estates, Calif.

[73] Assignee: Environmental Protection Polymers, Inc., Rolling Hill Estates, Calif.

[21] Appl. No.: 97,295

[22] Filed: Jul. 26, 1993

[51] Int. Cl.⁶ .............................................. B29C 43/20
[52] U.S. Cl. ................................. 264/112; 264/113; 264/254
[58] Field of Search ........ 264/112, 113, 254, DIG. 69

[56] References Cited

U.S. PATENT DOCUMENTS

| | | | |
|---|---|---|---|
| 3,330,088 | 7/1967 | Dunlea, Jr. | |
| 3,451,185 | 6/1969 | Tezuka | |
| 4,234,632 | 11/1980 | Lubowitz | 428/2 |
| 4,756,681 | 7/1988 | Unger et al. | 425/112 |
| 4,859,395 | 8/1989 | Unger et al. | 264/254 |
| 4,932,853 | 6/1990 | Unger et al. | 25/112 |
| 5,106,554 | 4/1992 | Drews | 264/112 |

*Primary Examiner*—Mary Lynn Theisen
*Attorney, Agent, or Firm*—Timothy T. Tyson

[57] ABSTRACT

A method for disposing of waste material employs an agglomerate formed by molding an admixture of waste material and thermosetting binder. The use of a thermoplastic resin sheet in conjunction with the agglomeration mold promotes the safety of the molding process. Dust and mold leakage is abated and it subsequently yields a resin coated agglomerate that is safe for handling. The performance of the agglomerate is enhanced by formation of a coating of resin chemically bonded onto its surface. The performance of the agglomerate may be further enhanced by the formation of a seam-free thermoplastic resin jacket over the resin coated agglomerate.

21 Claims, 2 Drawing Sheets

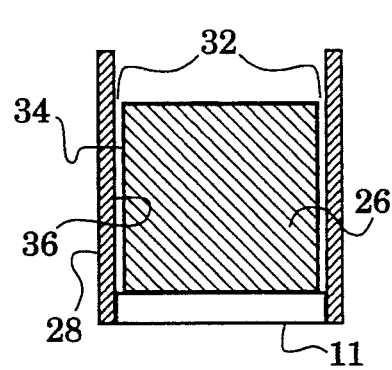
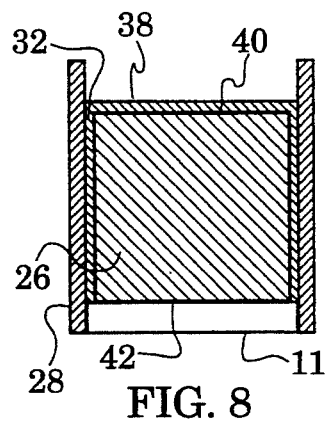
FIG. 7    FIG. 8
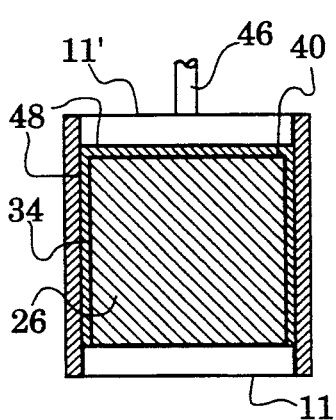
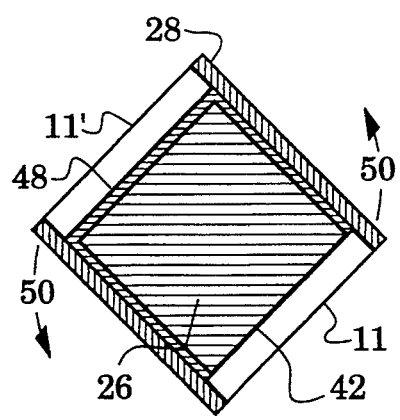
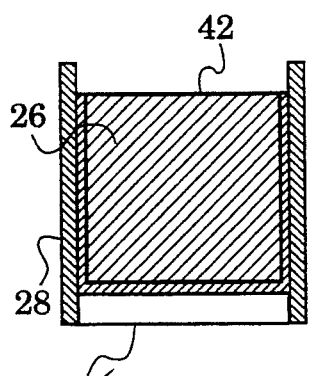
FIG. 9    FIG. 10    FIG. 11
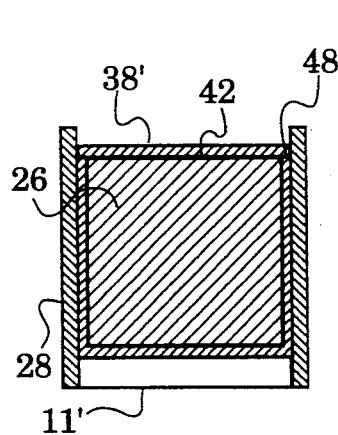
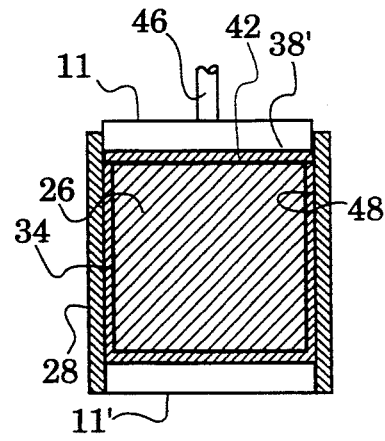
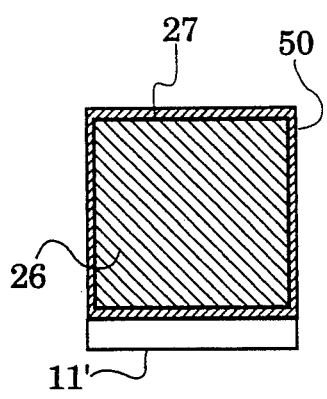
FIG. 12    FIG. 13    FIG. 14

METHODS FOR ENCAPSULATING WASTE AND PRODUCTS THEREOF

TECHNICAL FIELD

The invention relates to solidification/stabilization of toxic waste material.

BACKGROUND ART

A process is described in U.S. Pat. No. 4,234,632 (Lubowitz) by the present inventor for the fabrication of waste forms by molding with match dye molds. Toxic material is mixed with thermosetting resin and the mixture is charged into an agglomeration mold where it is confined and subjected to heat to form an agglomerate. The free standing agglomerate placed in a second mold is then covered by powdered and/or pelletized thermoplastic resin and consolidated therein by heating and solidified by cooling thereby resin jacketing the agglomerate on the top and sides. The partially encapsulated agglomerate is then inverted in the mold. The untreated bottom of the agglomerate is covered with additional thermoplastic resin that is heated and solidified. During the heating and solidification of the resin, it fuses with that on the rim of the preformed jacket to complete resin encapsulation of the agglomerate.

A commercially viable full scale production apparatus and method for practicing the process of the above described patent for treating hazardous wastes is described in U.S. Pat. No. 4,756,681 (Unger-1), U.S. Pat. No. 4,859,395 (Unger-2), and U.S. Pat. No. 4,932,853 (Unger-3) all by the present inventor, Unger, and Telles. These patents describe a three stage mold and a method for using same. In the first of three stages, a large volume of waste material is admixed with a thermosetting resin and transferred to an agglomeration mold. The moldable admixture of waste material and thermosetting resin is confined therein and transformed into a dimensionally stable agglomerate by the application of heat. The free standing agglomerate is then enveloped in the second stage by a jacketing mold, and submerged by thermoplastic resin, as powder and/or pellets, added in the space between agglomerate and jacketing mold and to the top of the agglomerate. After the application of heat and moderate pressure, a jacket of thermoplastic resin approximately 6 mm. (¼ inch) thick, fused onto the sides and top of the agglomerate, forms upon cooling the mold. In the third stage, the partially, encapsulated agglomerate and mold are inverted together. Additional powder and/or pellets is added and fused onto the former bottom of the agglomerate and to the rim of the preformed jacket to form a fully jacketed agglomerate. Once complete, the waste form exhibits seamless resin encapsulation of the agglomerate. Inversion of agglomerate and mold together, allowed by the equipment and the method, significantly advances large scale management of hazardous wastes. A large volume of hazardous waste is encapsulated by protective thermoplastic resin. The seam free jacket of thermoplastic resin fused upon the surface of the agglomerate gives rise to waste forms that withstand severe stresses of transportation, leaching stresses and physical stresses, such as freeze-thaw and wet-dry, that may occur in a landfill. Additional references with respect to this process are chapters of two books: "Surface Encapsulation Process for Stabilizing Intractable Contaminants", by Unger, Telles and Lubowitz (the present inventor), pp. 40–52, *Environmental Aspects of Stabilization and Solidification of Hazardous and Radioactive Wastes,* © 1989, ASTM STP 1033, Pierre Cote and Michael Gilliam, editors; and "EPP Process for Stabilization/Solidification of Contaminants" by Unger and Lubowitz (the present inventor), pp. 77–86, *Physical/Chemical Processes, Innovative Hazardous Waste Treatment Technology Series,* © 1990, Volume 2, Technomic Publishing Co., Inc., edited by Harry M. Freeman.

Other methods of waste management entail surface treatment of agglomerates, such as spraying or dipping of the agglomerate in a suitable coating material such as asphaltum or wrapping in a wire mesh, as disclosed in U.S. Pat. No. 3,330,088. Alternatively, the agglomerated wastes may be wrapped in a vinyl sheet as disclosed in U.S. Pat. No. 3,451,185. The large scale processes described in these two patents may be suitable for the management of general refuse but they are not suitable for achieving high performance management of low energy radioactive wastes and industrial hazardous wastes. The art described by Unger 1, 2 and 3, in contrast, yields processing advantages, and waste forms that secure contaminants under harsh environmental stresses of waste management due to leaching, overburden, alternative wet and dry conditions, alternative freezing and thawing conditions, and mechanical impact.

The use of polyethylene for management of contaminated ion exchange resin particulates and of evaporator concentrates is disclosed by Norboru et al. in *Nuclear and Chemical Waste Management* ©1982, Vol. 3, pp. 23–28 and 131–137. Norboru discloses that polyethylene is a superior binder for this purpose. But waste forms resulting in the above art hold low concentration of wastes due to the difficulty of effectively blending high concentrations into polyethylene resin.

Other methods of disposing of wastes include confining them in plastic or metal containers, or mixing wastes with binder materials such as aqueous cements and resins, and solidifying mixtures of wastes and binder in the containers. All of these methods have significant disadvantages. Both plastic and metal containers require prefabrication prior to waste management and thus they entail transporting appreciable unoccupied volume, and in addition, have a high relative initial cost. Containers are also subject to such problems as ineffective sealing and corrosion which eventually allows leaching and seepage of the contents. Even the combination of confining waste and binder mixtures in containers does not assure effective waste stabilization due to the shortcomings of containers.

None of the above techniques address the issue of dust and/or leakage of containments during the process of confining or securing toxic materials. Due to the nature of the techniques, workers practicing the above waste management processes need appreciable provisions for protection against contamination by such wastes. Waste materials may escape by dust formation, leakage, fragmentation, etc. Consequently, a need exists for improved techniques for abating the contamination of work places in the management of toxic waste and for fabricating high performance waste forms.

SUMMARY OF THE INVENTION

The present invention is directed to methods for encapsulating waste materials which are cost effective and which enhance the safety of involved personnel. In particular, methods in accordance with the invention are realized with simple, inexpensive molds and materials which reduce dust and leakage typically involved in the handling and packaging of waste and contaminants. The methods permit relaxation of the fabrication tolerances typically required in waste encapsulating molds. The life of the molds is lengthened by the reduction in exposure to corrosive wastes. Exposure of personnel to toxic materials during encapsulation is also reduced by the controlled handling of the waste. Exposure after encapsulation is reduced by the durability of the resulting product. The invention also includes products produced using the methods.

Methods in accordance with the invention are characterized by the steps of mixing waste material with a thermosetting binder to form an admixture thereof, enclosing the admixture in thermoplastic sheet material and applying heat and pressure to the admixture and the enclosing sheet to transform them respectively into a rigid agglomerate having an outer coat of fused resin.

In a preferred method embodiment, the enclosing step includes the steps of providing an open top mold, lining the mold with a pouch of the thermoplastic sheet material, and pouring the admixture into the pouch. The applying step includes the steps of abutting the pouch with a mold top and applying pressure to the mold top.

In another preferred method embodiment, an upper portion of the pouch of thermoplastic material is formed into a sleeve and the admixture is directed into the sleeve with a chute. In yet another preferred method embodiment, at least a portion of the air within the pouch is removed prior to the pouring step.

In a preferred method embodiment, the thermosetting binder is comprised of atactic 1,2-polybutadiene, the thermoplastic sheet material is comprised of polyethylene, and the applied heat is between 79° C. and 191° C. (200° F. and 400° F.).

In another preferred method embodiment, the admixture is augmented with polyfunctional epoxides, post-consumer polymers and glass fabric.

In another preferred method embodiment, a coating of thermosetting polyester—chopped glass fiber is substituted for the thermoplastic sheet material.

Methods in accordance with the invention are further characterized by the steps of surrounding the fused sheet resin coat with particulate thermoplastic resin and subjecting it to heat and pressure to form an outer jacket of fused particulate resin over the fused sheet resin coat.

The novel features of the invention are set forth with particularity in the appended claims. The invention will be best understood from the following description when read in conjunction with the accompanying drawings.

BRIEF DESCRIPTION OF THE DRAWINGS

FIGS. 1–14 illustrate preferred method and apparatus embodiments, in accordance with the present invention, wherein:

FIG. 1 is a sectional view of an empty agglomeration mold;

FIG. 2 illustrates a pouch within the mold of FIG. 1;

FIG. 3 illustrates a pouch within the mold of FIG. 1 wherein the pouch defines an upward extending sleeve to receive a loading chute;

FIG. 5 illustrates a mold top compressing the admixture and pouch of FIG. 4A;

FIG. 6 illustrates a resin coated waste agglomerate resulting from the application of pressure and additional heat during the step shown in FIG. 5;

FIG. 7 illustrates the resin coated agglomerate and mold base of FIG. 6 within a jacketing mold;

FIG. 8 shows the resin coated rigid agglomerate of FIG. 7 submerged in thermoplastic resin particulates;

FIG. 9 shows a mold top compressing the resin coated rigid agglomerate and thermoplastic resin particulates of FIG. 8 and application of heat;

FIG. 10 illustrates inversion of the jacketing mold of FIG. 9;

FIG. 11 illustrates the inverted jacketing mold with the former mold base removed;

FIG. 12 shows the resin coated rigid agglomerate of FIG. 11 covered by more thermoplastic resin particulates;

FIG. 13 shows a mold top compressing the mold contents of FIG. 12 and application of heat; and, FIG. 14 illustrates a jacketed resin coated agglomerate resulting from the application of pressure and additional heat during the step shown in FIG. 13.

MODES FOR CARRYING OUT THE INVENTION

Figure 1:
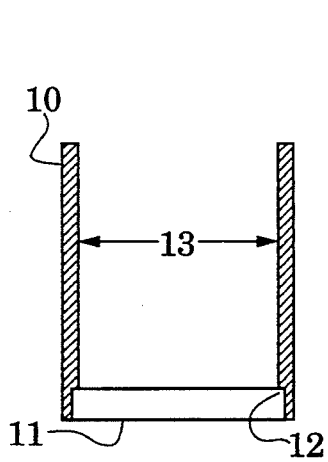

The following cases exemplify the benefits of the invention: For fabrication of agglomerates of toxic wastes stemming from an admixture of binder resin and particulated toxic wastes, such as particles of heavy metal wastes and/or those of ion exchange materials holding low-energy radioactive contaminants that stem from treating aqueous waste streams from nuclear plants with ion-exchange resins and/or inorganic substances, a useful, simple agglomeration mold consists of a pipe-like steel sleeve resting upon a steel, stepped platform. Upon heating the admixture in this mold, in certain cases, admixture may migrate onto the platform from the interface of the sleeve and the platform. One method for correcting this problem is to cause an intimate contact of sleeve and platform by precision matching of the mold components, and another, by placement of gaskets and/or sealant in the interface area. But such methods may incur additional costs regarding molds and processing, and these costs may impede commercial acceptance. A simple, low cost method is required to correct the problem. And this is addressed by lining the agglomerate mold with polyethylene sheet forming a pouch prior to placement of the toxic waste admixture into the mold.

The retention of the toxic admixture in the mold occurs as follows: Upon heating the mold, the polyethylene sheet undergoes softening, and therewith "pleats" occurring in lining the polyethylene sheet into the mold are "ironed out" due to compression of the sheet onto the inner walls of the sleeve and the surface of the platform by the applied weight of the toxic consignment, which is simultaneously hardening. Thereby plastic sheet material simultaneously seals the mold and smoothly coats the agglomerate. Although the sheet softens, it yet prevents delocalization of toxic consignment at mold interfaces due to its high melt strength.

With cooling of the mold, the sheet solidifies. The result is a significantly toughened agglomerate due to its encapsulation by tough polyethylene sheet material adhering to its surface. The sheet provides additional benefit by provision of an inert barrier between agglomerate and personnel.

The benefit of the plastic pouch applies to agglomeration molds with greater metal interface area than those of pipe-like sleeves. Thus a "split mold" whereby a sleeve is formed by tongue and groove pairing of a sectioned metal cylinder may be employed notwithstanding its additional interface area. Such molds are useful in the practice of this invention because they may facilitate demolding of toxic waste agglomerates, and they eliminate the need for overhead lifting apparatus required for demolding waste agglomerates from a pipe-like sleeve. In addition, rectangular molds with joined steel plates are employable. Conservation of space for waste storage may favor rectangular products over cylindrical products.

Further treatment of the resin coated agglomerate by thermoplastic resin such as polyethylene encapsulates it by a seam-free resin jacket, about 6 to 10 mm. (¼ to ⅜ inch) thick. Polyethylene resin "flash" resulting in the encapsulating operation does not constitute a safety or environmental hazard because, in contrast to the admixture, this material is non-toxic. The resin flash can be recaptured and powdered and/or pelletized for further use in the invention. Due to the toughness of the free-standing resin coated agglomerates, thermoplastic recycle resin rather than virgin resin may be employed in fabricating waste forms with high performance, thereby giving rise to its useful employment, reducing resin costs for waste forms and facilitating recycle resin disposal.

An apparatus for practicing the process of the present invention is described in U.S. Pat. No. 4,756,681 (Unger-1), U.S. Pat. No. 4,859,395 (Unger-2), and U.S. Pat. No. 4,932,853 (Unger-3), incorporated herein by reference. These patents describe a three stage mold and a method for using same. The first stage of the Unger apparatus employs an agglomeration mold.

In the present invention, the agglomeration mold is fitted with a plastic lining of thermoplastic sheet resin, preferably of polyethylene resin sheet stock. Other resin sheets are also employable, e.g., polyester, polyolefin, polyamide, polyvinylidene fluoride, polyvinylidene chlorides, as alternative preferred compositions for mold lining. Multiple resin sheets are employable for making a thicker mold lining and thicker resin coating of resulting agglomerates. The thermoplastic sheet lines the cavity of the agglomeration mold so as to form a pouch therein. When toxic material is loaded into the agglomeration mold, it is confined within the pouch. The pouch serves to abate emission of contaminates from the agglomeration mold in agglomerate formation. Without the pouch, toxic material can leak through worn or low tolerance sealing surfaces of the mold.

Accordingly, use of the pouch can relax the tolerances required when machining the agglomeration mold, i.e. the precision of the machining process is relaxed. Relaxing the standard of precision for machining the mold reduces the cost of such machining.

Further cost savings are realized by use of the pouches due to the enhanced life expectancy of the agglomeration mold. The life expectancy of the mold is enhanced because the pouch prevents or reduces the intrusion of waste particles onto the surfaces and interfaces of the mold cavity. Absence or reduced presence of waste particles at mold surfaces and interfaces diminishes metal corrosion and the rate of wear of mold tolerances.

In an embodiment of the apparatus, a chute is employed for directing toxic material into the pouch. In an embodiment of the method, the pouch is extended as a pipe or sleeve toward and connected with the exit spout of the chute. The connection between the chute and the pouch helps to abate the emission of dust or particulate material during the transfer process. Furthermore, if the pouch forms a closed system with the chute, i.e. the only access to or from the pouch is through its connection with the chute, and if the pouch remains substantially deflated with respect to air, then, when material is charged into the pouch through the pouch sleeve, very little air is displaced therefrom. Instead, as the pouch is filled with material, it displaces air from the cavity of the agglomeration mold. The presence of the pouch prevents contact between the air in the mold and the material being charged into the pouch. Accordingly, as air is discharged from the agglomeration mold by the expanding pouch, it does not contact the waste material being charged therein and does not generate dust formation. Accordingly, the pouch can serve to prevent or abate the generation and emission of air born dust.

After the pouch is positioned within the cavity of the agglomeration mold and/or connected to a spout, it is then filled or charged with a moldable admixture of waste material and a thermosetting resin binder. The thermosetting binder is of a type which can form a consolidated agglomerate with the waste material upon the application of heat. The resultant consolidated agglomerate has a rigid structure. Preferred thermosetting binders as described in U.S. Pat. No. 4,234,632 may be utilized, the disclosure of which is hereby incorporated by reference and made a part hereof. Atactic 1,2-polybutadiene with a molecular weight of about 3000 is a preferred thermosetting resin binder.

Low molecular weight binders are preferred because of their greater fluidity. A high level of fluidity is useful when blending high concentrations of waste with binder prior to agglomeration. On the other hand, excessive fluidity due to the use of low molecular weight binders may give rise, in some cases, to resin drainage in the agglomeration mold during heating, thereby circumventing desirable uniform distribution of resin within the agglomerate. Drainage depletes resin from the top of the agglomerate and enriches the bottom with an excessive proportion. To prevent this occurrence, polybutadiene resin fitted with chemically functional groups and combined with coreactants, such chemical compositions reacting at temperatures above room temperature but below that needed for chemical thermosetting of the binder, causes formation of a viscous or gel state at moderate temperatures which inhibits binder migration at the elevated temperatures needed for 1,2-polybutadiene binder thermosetting. Preferred compositions are those of carboxyl terminated atactic 1,2-polybutadiene and polyfunctional epoxides. Unrefined polybutadiene resin and epoxides are employable for making agglomerates thus reducing costs for thermosetting binders.

The moldable admixture may also include a supplemental component of thermoplastic binders. Post-consumer polyethylene, nylon, polypropylene, and polyester may also be employed as supplemental components of the binder resin. Such resins are generally considered unsuitable for injection molding and blow molding due to their unpredictable rheological properties. However, as supplemental components of a moldable admixture processed in the heated agglomeration mold, the rheological properties of recycle resin do not materially affect properties of the fabricated agglomerate. Since these materials may be less costly than polybutadiene, their utilization in conjunction with polybutadiene may further reduce cost of agglomerate fabrication.

The toxic waste may be either particulate or mixed with water in the form of an aqueous sludge. Sludges are solidified prior to agglomerate formation. Cementious materials such as portland cement may be employed to solidify aqueous sludges into friable monolithic material and subsequently particulated. Oil containing sludges may be managed likewise by clay materials in conjunction with aqueous cements. Examples of particulate wastes suitable for treatment in this process include those holding heavy metal contaminants such as arsenic, lead, mercury, and radioactive materials. After thorough blending, the polybutadiene resin treated particulate wastes may be free flowing particulates. In all cases, the mixtures are stable under atmospheric conditions, thus permitting their subsequent agglomeration to be scheduled as desired. An example of a sludge suitable for treatment is one holding PCB's.

As a result of heating, the mixtures consolidate by the polybutadiene undergoing chemical thermosetting thereby creating a rigid matrix for the toxic waste. Thermosetting is initiated by peroxides such as employed in the peroxide vulcanization of rubber. The 1,2,-configuration polybutadiene gives a high yield of chemical cross-links in a fast chemical reaction. In the course of heating and reaction, recycle polyethylene particulates within the blend are chemically incorporated into the polybutadiene. The resulting rigid resin matrix has singly bonded carbon, chemically cross-link configurations which provide inherent resistance to matrix degradation by oxidation, hydrolysis, radiation, and permeation by water and solvents. Once the thermosetting of the polybutadiene has occurred, reheating does not remelt the toxic waste agglomerate.

The pouch also participates in the thermosetting process which occurs during heating of the toxic waste admixture in the mold. When the pouch in the cavity of the agglomeration mold is charged with the moldable admixture, it may pleat therein, due to weight and conformation of the deposited material to the mold cavity. However with the application of heat, the pleated pouch will conform to the inner walls of the mold and thus form a smooth coating on the agglomerate surface. There are two elements of such integration, viz.:

1. The pouch material will undergo fusion and will mate with polybutadiene binder at the surface of the agglomerate, and
2. The thermosetting binder will chemically cross link with the pouch resin so as to form chemical bonding between the pouch and the waste agglomerate.

When heated, the thermoplastic composition of the pouch thus softens and adheres to the surface of the waste agglomerate. Due to its high viscosity in the softened state and due to its proximity to the surface of the mold cavity, the pouch material will tend not to migrate within the cavity and will tend to remain at the surface. Chemical cross linking occurs between the 1,2,-configuration polybutadiene and the polyethylene sheet material of the pouch in the heated mold and this further tends to hold the pouch in place. Accordingly, at the conclusion of heating and with cooling, the surface of the resulting waste agglomerate will be resin coated and encapsulated by the pouch resin. This coat forms a seal of polyethylene resin onto contaminates on the surface of the agglomerate and prevents their contact with personnel and equipment. It also significantly advances the toughness of the agglomerate.

The coating of a waste agglomerate with a sheet of thermoplastic material significantly enhances the performance of the agglomerate as compared to that of uncoated agglomerates. Coated agglomerates exhibit enhanced safety during fabrication, handling and disposal due to its advanced physical and mechanical properties over those of uncoated agglomerates. These advantages are optimized by chemical adhesion of the thermoplastic material at the agglomerate surface with the agglomerate binder. The high strength of adhesion stems from chemical forces at the interface by virtue of covalent bonding as well as polar, van-der-waal, and dispersion phenomena.

The strength of the bond formation between the agglomerate and its thermoplastic coating may be optimized by use of the 1,2-polybutadiene as the resin binder for agglomerate formation in conjunction with the use of a pouch having a composition of polyethylene resin. This combination is cost effective and yields optimal chemical bonding at the interface of agglomerate and coating. During agglomerate formation, binder resin wets both waste particles and the polyethylene resin pouch due to favorable surface energetics. Agglomerate formation occurs by homopolymerization of polybutadiene. Polymerization is enhanced by incorporation of free radical formation catalysts into the polybutadiene resin, e.g., known peroxide catalysts used in rubber vulcanization. The preferred temperature range for agglomerate formation is between 79° C. and 191° C. (200° F. and 400° F.). As the agglomerate is heated from ambient temperature to the preferred temperature range, binder wetting of the pouch resin is enhanced due to some binder impregnation at the higher temperature, thereby enhancing free radical interaction of the binder and the pouch.

Free radical polybutadiene polymerization is the phenomenon that causes formation of rigid agglomerates of toxic wastes. In the case of 1,2-polybutadiene, in contrast to 1,4-polybutadienes, catalysts cause a greater amount of the resin unsaturation to be chemically consumed, thus enhancing agglomerate rigidity. In the presence of the polyethylene pouch, it is postulated that the electron bearing polybutadiene can extract from the polyethylene resin a hydrogen atom which terminates the propagation reaction of the polybutadiene. However, an electron transferred to the polyethylene resin initiates further polybutadiene polymerization, thereby causing chemical linkage between polybutadiene and polyethylene. Chemically enhanced adhesion of the binder and the coating, as stated previously, advances performance of agglomerates of toxic wastes.

Accordingly, performance of the coated waste agglomerate is superior to uncoated waste agglomerates because the presence of the coat tends to prevent or abate the following processes, viz.:

1. Particles of contaminant are less likely to be displaced from the surface of waste agglomerates due to contact by personnel and equipment; and 2. Chipping or fragmentation of the surface of the waste agglomerate due to mishaps during handling is abated by the presence of the fused coat.

In another preferred embodiment, the agglomerate may be further strengthened by the addition of glass fibers to the admixture of toxic material and binder thereby toughening the agglomerate. Alternatively, when formation of appreciably toughened agglomerates are required glass mat or glass fabric may be employed. After the cavity of the agglomeration mold has been draped by thermoplastic sheet material to form a pouch therein, a glass fabric disc may be placed in the pouch so that it rests on the bottom of the mold and then glass fabric in the form of a scroll is inserted into the pouch and onto the disc, and unravels to press the pouch against the cavity. An admixture of waste material and binder "snugs" the plastic sheet and glass fabric against the mold walls by its weight. A glass fabric disc is then place atop the admixture and the thermoplastic resin pouch is then folded thereon. During the curing process, binder material within the admixture wets and penetrates the glass fabric and contacts the thermoplastic sheet material. In the final cure state, the glass fabric and the pouch are bonded together upon chemical bond formation between pouch resin and binder resin thus advancing appreciably the mechanical strength of the resin coated agglomerate.

As a further preferred embodiment, the agglomerate may be mechanically strengthened by spraying the cavity of the agglomeration mold with a thermosetting polyester-chopped glass fiber mixture so as to form a glass reinforced resin sheet coated thereon. Some commercial compositions harden at atmospheric temperatures. The admixture of waste material and thermosetting binder is then transferred into the coated mold. Once the transfer is completer the top of the admixture is sprayed with polyester-chopped glass. Provision is made for this top material to contact at the edge with that sprayed previously so as to encapsulate the admixture therein. When the ensemble is heated, the admixture consolidates to form an agglomerate. The resulting product obtained upon demolding is a free standing agglomerate coated by glass-fiber reinforced resin. Alternatively, waste materials may be made free standing without need for waste hardening due to the rigid nature of the glass fiber reinforced resin coating. Such ensembles are suitable for further treatment by encapsulation with thermoplastic resin. The binder may therefore be omitted when encapsulating these types of waste materials.

The following is a diagrammatic description of resin coated agglomerate and waste form fabrication.

FIGS. 1 through 5 illustrate the first stage in the molding process which provides a means for molding the first moldable material to create the rigid agglomerate. FIG. 1 is the first step in the process and shows a sectional view of an empty agglomeration mold 10 combined with a base 11. A preferred agglomeration mold has a sleeve configuration. However, agglomeration molds having a split configuration or a "clam" configuration may also be employed. Such molds are simple and facilitate the demolding process by eliminating the need for overhead gear needed to free the agglomerate from the sleeve. In the preferred embodiment, the agglomeration mold 10 is cylindrical and the base 11 is circular. A step 12 in the bottom of the agglomeration mold 10 provides vertical and horizontal registration of the agglomeration mold 10 on the base 11. The inner diameter of the mold 10 represented by the arrow 13 determines the outer diameter of the agglomerate.

Figure 2:
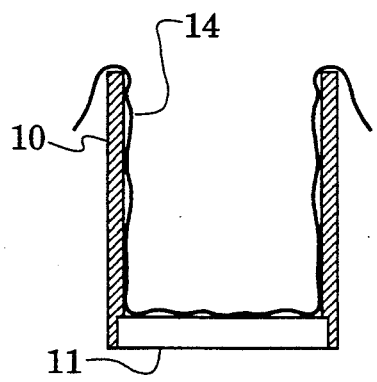

FIG. 2 illustrates the insertion into the cavity of the agglomeration mold of a pouch 14 having a composition of thermoplastic sheet material. In this instance, the thermoplastic sheet material is merely draped over the cavity of the agglomeration mold.

Figure 3:
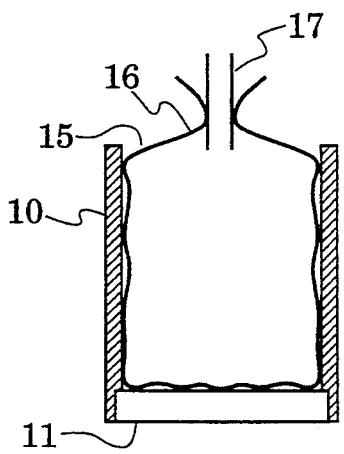

FIG. 3 illustrates a modified pouch 15 having a sleeve or pipe 16 which is extended to connect with the exit of a chute 17. The pouch can be deflated and inserted within the cavity of the agglomeration mold. When material is passed through the chute, it is collected within the pouch.

Figure 4A:
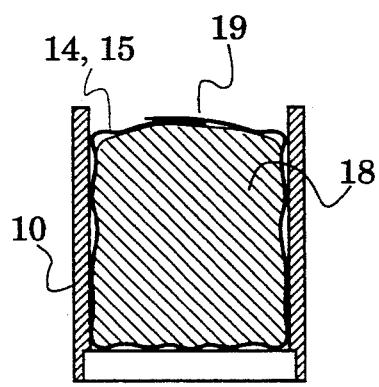
FIG. 4A shows an admixture of waste material and thermosetting binder loaded into the pouch of either FIG. 2 or FIG. 3.

FIG. 4A illustrates a moldable admixture 18 transferred into the pouch 14 (or 15) within the cavity of the agglomeration mold. After the transfer is complete, the upper portion of the pouch is disconnected from the chute and folded atop the moldable admixture.

Figure 4B:
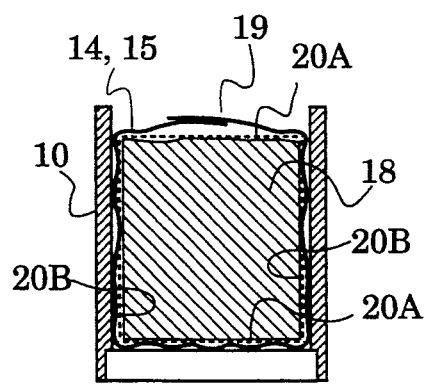
FIG. 4B shows a lining of glass fabric between the admixture and pouch of FIG. 4A.

FIG. 4B illustrates an alternative method embodiment in which the steps summarized in FIG. 4A are augmented by a lining of glass fabric disposed between the pouch 14 and admixture 18 of FIG. 4A.

Prior to transferring the admixture 18 into the pouch 14, a glass fabric disc 20A is placed in the bottom of the pouch 14 and then a scroll 20B of glass fabric is inserted to line the walls of the pouch 14. After transferring the admixture 18 but prior to folding the upper pouch portion 19 thereon, another glass fabric disc 20A is placed over the admixture 18 (the discs 20A and scroll 20B are indicated by broken lines for clarity of illustration).

Figure 4C:
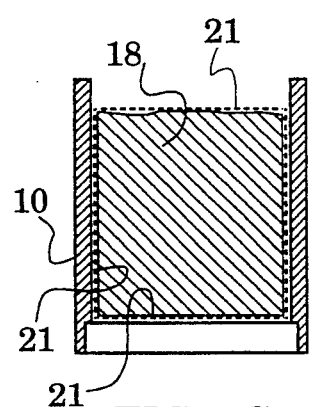
FIG. 4C shows, in the mold of FIG. 1, thermosetting polyester—chopped glass fiber surrounding an admixture of waste material.

FIG. 4C illustrates another preferred method embodiment in which the steps summarized in FIG. 4A are replaced by coating the interior of the mold 10 and base 11 with a thermosetting polyester—chopped glass fiber 21. The admixture 18 is then transferred into the mold 10. Additional thermosetting polyester—chopped glass fiber is then sprayed over the top of the admixture 18 (the lining 21 is indicated by broken lines for clarity of illustration).

Figure 5:
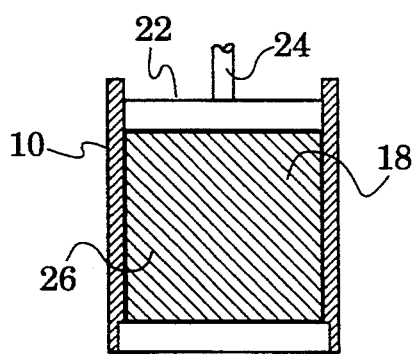

Any of the preferred methods of FIGS. 4A, 4B, and 4C may be practiced prior to the steps shown in FIG. 5 which is a sectional view similar to FIG. 4A with a rigid top 22 positioned inside the agglomeration mold 10 to apply pressure to compress the mixture 18 and eliminate any voids. A shaft 24 connected to a piston provides a first compression means to force the top 22 down and heat is applied causing the polybutadiene to thermoset creating a rigid agglomerate 26 of the mixture 18. Complete curing occurs when the center of the mixture 18 reaches approximately 135° C. (300° F.). Cure times are dependent upon the proportion of the waste material, the proportion of polybutadiene, the shape of the mold, the heat of the mold, and the bulk of the mixture 18. In the preferred embodiment, a preferred volume of the admixture is between 38 and 380 liters (approximately 10-100 gallons) and a most preferred volume is 163 liters (approximately 43 gallons). In a preferred mode, the rate of production of waste agglomerates is enhanced by placing several charged agglomeration molds in a large oven at one time.

An alternative method is also available for the method shown in FIG. 4C. Waste materials may be rendered free standing without addition of binder resin due to the rigid nature of the glass fiber reinforced resin coating. The binder may therefore be omitted when fail safe criteria can be somewhat relaxed in the final product. The time required to complete the molding process is significantly reduced as the entire mass does not need to be heated.

Figure 6:
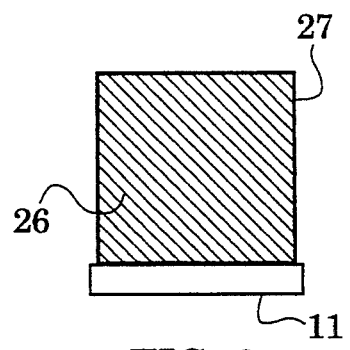

FIG. 6 is a sectional view of the agglomerate 26 sitting on the base 11 after removal of the agglomeration mold 10 and the mold top 22 shown in FIG. 5. Shrinkage of the agglomerate 26 away from the agglomeration mold 10 occurs as the agglomerate 26 cools facilitating the removal of the mold 10. The resultant rigid agglomerate is sealed with an outer coat 27 of fused resin from the thermoplastic sheet material of the pouch in the case of the method illustrated in FIG. 4A, a thin layer of fused thermoplastic sheet material and glass fabric in the case of the method illustrated in FIG. 4B, or a thin layer of thermosetting polyester—chopped fiber in the case of the method illustrated in FIG. 4C.

In a preferred embodiment, the performance of the resultant coated waste agglomerate may be further enhanced by transferring the resin coated waste agglomerate to a jacketing mold. The coated waste agglomerate is jacketed therein with thermoplastic resin, preferably polyethylene resin. The thermoplastic resin employed to encapsulate the rigid agglomerate may be powdered, pelletized, and/or reground, hereinafter referred to as "particulate" and is preferably high density or linear low density polyethylene. The jacketing mold employed provides a gap to the surface of the agglomerate. The gap is filled with the particulate polyethylene. Upon heating and cooling, the polyethylene forms a tough jacket that is adhesively and chemically bonded to the surface of the agglomerate. Polyethylene is a thermoplastic that melts on reheating. The remelting of a portion of the plastic jacket is useful in the method of the present invention because it allows particulate polyethylene to be added at a later stage of the encapsulation process. In this later stage, the added resin melts and fuses with the previously molded particulate polyethylene to complete the seamless encapsulation of the agglomerate. The jacket thickness is determined by the dimension of the gap provided by the jacketing mold. A preferred range of this gap is between 2 mm. and 2.5 cm. (approximately 1/16 and 1 inch) with a most preferred gap of 1 cm. (approximately ⅜ inch).

The resultant jacketed waste agglomerate is then demolded to yield a seamless encapsulation of such agglomerates. The resulting jacketed agglomerates can withstand the stresses of handing and transportation and exhibit enhanced long term immobility of their content in final disposal in the earth. The process for jacketing coated waste agglomerates is similar to the process for jacketing uncoated waste agglomerates as taught by Unger (supra).

The jacketing process is enhanced by the formation of the chemically bonded coat of polyethylene on the surface of an agglomerate. The polyethylene interlayer bridges the thick polyethylene jacket to the agglomerate surface by means of strong chemical bonding, i.e. the polyethylene coat is chemically bonded to the agglomerate surface and is fused to the polyethylene jacket. Jacketing without a coating of chemically bonded polyethylene relies upon mechanical forces and non-covalent bond adhesion between the two layers.

FIGS. 6 through 14 illustrate the jacketing process. FIG. 6 illustrates a resin coated rigid agglomerate 26 demolded from the agglomeration mold and sitting on the base 11. FIG. 7 is a sectional view similar to FIG. 6 with a jacketing mold 28 combined with the base 11. The jacketing mold 28 is also cylindrical. The horizontal registration for the jacketing mold 28 on the base 11 is determined by the diameter of the base 11. The jacketing mold 28 creates a gap 32 between the sides 34 of the agglomerate 26 and the inner surface 36 of the jacketing mold 28 for molding a second moldable material such as particulate polyethylene around the sides 34. FIG. 8 is a sectional view similar to FIG. 7 with particulate polyethylene 38 poured over the top 40 of the agglomerate 26 and into the gap 32 to load the base 11 and the jacketing mold 28. The depth of the particulate polyethylene over the top 40 is adjusted to be approximately equal to the predetermined thickness provided by the gap 32. The bottom 42 of the agglomerate 26 remains sitting on the base 11.

FIG. 9 is a sectional view similar to FIG. 8 with a base 11' on top of the polyethylene 38. The base 11' is identical to the base 11 allowing interchange. A second compression means represented by a shaft 46 presses the base 11' of the jacketing mold onto the polyethylene 38. The particulate polyethylene 38 is then heated to melt and consolidate the polyethylene 38. The polyethylene 38 is cooled to form a jacket 48 on the sides 34 and the top 40 of the agglomerate 26.

FIGS. 10 through 14 illustrate the second portion of the jacket molding process which provides for inverting the partially jacketed agglomerate 26 and a means for molding the second moldable material on the former bottom 42 to jacket the former bottom 42 of the agglomerate 26 and complete the seamless encapsulation of the agglomerate 26. FIG. 10 is a sectional view similar to FIG. 9 with the shaft 46 removed and the partially jacketed agglomerate 26, jacketing mold 28, and bases 11 and 11' being inverted as indicated by the arrows 50.

FIG. 11 shows the view of FIG. 9 inverted 180° with the base 11 and shaft 46 removed exposing the unjacketed former bottom 42 of the agglomerate 26.

FIG. 12 is a sectional view similar to FIG. 11 with particulate polyethylene 38' loaded over the former bottom 42 of the agglomerate 26 and the jacket 48 adjacent the former bottom 42 to a depth approximately equal to the gap 32 of FIG. 7.

FIG. 13 is a sectional view similar to FIG. 12 with the base 11 replaced in the jacketing mold 28 to abut the added particulate polyethylene 38'. The base 11 is under compression from the shaft 46 to create sufficient pressure to mold the added particulate polyethylene 38'. Both the newly added polyethylene 38' and the adjacent polyethylene jacket 48 are then heated. Upon heating both polyethylene components melt and fuse to one another. Upon cooling, the fused components of polyethylene form a seamless jacket 50 shown in FIG. 14 to complete the encapsulation of the agglomerate 26. As noted above, the remelting of a portion of polyethylene jacket 48 on the sides 34 is useful in the method of the present invention because it allows the former bottom 42 to be jacketed at this later stage and fuse with the previously molded jacket 48 on the sides 34 producing a seamless encapsulation of the agglomerate 26. In addition, the melting of the particulate polyethylene also remelts the outer coat 27 (FIG. 6) of fused resin from the thermoplastic sheet material fusing all of the thermoplastic resin together.

FIG. 14 illustrates jacketed waste agglomerate 26 jacketed with the seamless jacket 50 demolded and sitting on the mold base.

The embodiments depicted herein are exemplary and numerous modifications and rearrangements can be made with the equivalent result still embraced within the scope of the invention.

What is claimed is:

1. A method of encapsulating waste material, comprising the steps of:
   mixing said waste material with a thermosetting binder to form an admixture thereof:
   enclosing said admixture with thermoplastic resin sheet material; and,
   applying heat and pressure to said admixture and said enclosing sheet material until they are respectively transformed into a substantially rigid agglomerate sealed with an outer coat of fused sheet resin.

2. The method of claim 1 further comprising the steps of:
   surrounding said agglomerate sealed with an outer coat of fused sheet resin with particulate thermoplastic resin; and,
   applying heat and pressure to said agglomerate sealed with an outer coat of fused sheet resin and said surrounding particulate thermoplastic resin until an outer jacket of fused particulate resin is formed over said coat of fused sheet resin.

3. The method of claim 1 wherein:
   said enclosing step includes the steps of; providing an agglomeration mold having an open top; lining said open top mold with a pouch of said thermoplastic sheet;
   pouring said admixture into said pouch up to an upper portion of said pouch; and,
   covering said admixture with said upper pouch portion; and,
   said applying step includes the steps of:
   providing a mold top;
   abutting said upper pouch portion with said mold top; and,
   applying pressure to said mold top.

4. The method of claim 3 wherein said pouring step includes the steps of:
   forming said upper pouch portion into a sleeve; and
   directing said admixture into said sleeve with a chute.

5. The method of claim 4 further comprising, prior to said pouring step, the step of removing at least a portion of the air within said pouch.

6. The method of claim 1 wherein said thermoplastic resin sheet material comprises polyethylene.

7. The method of claim 1 wherein said heat is between 79° C. and 191° C. (200° F. and 400° F.).

8. The method of claim 1 wherein said thermosetting binder comprises atactic 1,2-polybutadiene.

9. The method of claim 8 wherein said atactic 1,2-polybutadiene has a molecular weight of substantially 3000.

10. The method of claim 2 wherein said particulate thermoplastic resin comprises polyethylene.

11. The method of claim 1 wherein said mixing step includes the step of adding polyfunctional epoxides to said admixture.

12. The method of claim 1 wherein said mixing step includes the step of adding post-consumer polymers to said admixture.

13. The method of claim 1 wherein said mixing step includes the step of adding glass fibers to said admixture.

14. The method of claim 3 further comprising, prior to said pouring step, the step of lining at least a portion of the interior of said pouch with glass fabric material.

15. The method of claim 2 wherein said outer jacket has a thickness between 2 millimeters and 2.5 centimeters.

16. The method of claim 2 wherein:
   said surrounding step includes the steps of:
   providing a jacketing mold having an open top and dimensioned to leave a gap of a predetermined thickness between said outer coat and said jacketing mold;
   receiving said agglomerate sealed with an outer coat in said open top jacketing mold;
   filling said gap with said particulate thermoplastic resin;
   covering the exposed upper surface of said outer coat with said particulate thermoplastic resin to a thickness substantially equal to said predetermined thickness; and,
   abutting said particulate thermoplastic resin with a mold top;
   inverting said jacketing mold after said abutting step;
   removing said base; and,
   covering the exposed surface of said outer coat and said jacket with said particulate thermoplastic resin to a thickness substantially equal to said predetermined thickness.

17. The method of claim 16 wherein said predetermined thickness is substantially 1 centimeter thick.

18. A method of encapsulating waste material, comprising the steps of:
   providing a mold;
   coating the interior of said mold with thermosetting polyester resin—chopped glass fiber;
   transferring said waste material into said coated mold;
   coating the top of said waste material with thermosetting polyester resin—chopped glass fiber; and,
   applying heat and pressure to said waste material and said thermosetting polyester resin—chopped glass fiber until said waste material is sealed with an outer coat of fused thermosetting polyester resin—chopped glass fiber.

19. The method of claim 18 further comprising the steps of:
   surrounding said outer coat with particulate thermoplastic resin; and
   applying heat and pressure until an outer jacket of fused particulate thermoplastic resin is formed over said outer coat.

20. The method of claim 18 further comprising, prior to said transferring step, the step of mixing said waste material with a thermosetting binder to form an admixture thereof.

21. The method of claim 18 further comprising the steps of:
   surrounding said outer coat with particulate thermoplastic resin; and
   applying heat and pressure until an outer jacket of fused particulate thermoplastic resin is formed over said outer coat.

* * * * *